United States Patent
Spuller et al.

(10) Patent No.: US 10,857,479 B2
(45) Date of Patent: Dec. 8, 2020

(54) LIQUID DISTRIBUTOR IN COLUMNS, METHOD FOR PRODUCING A LIQUID DISTRIBUTOR AND COLUMN AND METHOD FOR SEPARATING SUBSTANCE MIXTURES

(71) Applicants: SGL CARBON SE, Wiesbaden (DE); SULZER MANAGEMENT AG, Winterthur (CH)

(72) Inventors: Ralph Spuller, Meitingen (DE); Carla Schuler, Wila (CH); Andreas Halbmeir, Meitingen (DE); Martin Kucher, Meitingen (DE)

(73) Assignees: SGL Carbon SE, Wiesbaden (DE); SULZER Management AG, Winterthur (CH)

( * ) Notice: Subject to any disclaimer, the term of this patent is extended or adjusted under 35 U.S.C. 154(b) by 0 days.

(21) Appl. No.: 16/236,849

(22) Filed: Dec. 31, 2018

(65) Prior Publication Data

US 2019/0134529 A1    May 9, 2019

Related U.S. Application Data

(63) Continuation of application No. PCT/EP2017/066193, filed on Jun. 29, 2017.

(30) Foreign Application Priority Data

Jun. 30, 2016 (DE) .......................... 10 2016 211 808

(51) Int. Cl.
*B01D 53/18* (2006.01)
*B01D 3/00* (2006.01)

(52) U.S. Cl.
CPC ........... *B01D 3/008* (2013.01); *B01D 53/185* (2013.01)

(58) Field of Classification Search
CPC .............................. B01D 3/008; B01D 53/185
USPC ..................................... 261/97, 110
See application file for complete search history.

(56) References Cited

U.S. PATENT DOCUMENTS

| | | |
|---|---|---|
| 3,795,388 A | 3/1974 | Toth |
| 4,543,218 A | 9/1985 | Bardo et al. |
| 4,994,210 A | 2/1991 | Lucero et al. |
| 5,017,309 A * | 5/1991 | Peterson ............... B01J 19/325 261/111 |
| 5,180,528 A | 1/1993 | Kaplan |

(Continued)

FOREIGN PATENT DOCUMENTS

| | | |
|---|---|---|
| DE | 19519241 A1 | 11/1995 |
| DE | 202010015436 U1 | 3/2011 |

(Continued)

*Primary Examiner* — Charles S Bushey
(74) *Attorney, Agent, or Firm* — Laurence A. Greenberg; Werner H. Stemer; Ralph E. Locher

(57) ABSTRACT

A liquid distributor is used as an internal column component for a defined distribution of a liquid flowing downward within a column. The liquid distributor includes at least a bottom and side walls which constitute a container for the accommodation and defined distribution of the liquid. The bottom and at least one of the side walls are constructed from panels that are connected to each other. The panel or panels of the at least one side wall include a fiber composite material. A column and a method for separating substance mixtures are also provided.

12 Claims, 2 Drawing Sheets

(56) References Cited

U.S. PATENT DOCUMENTS

| | | | | |
|---|---|---|---|---|
| 5,971,366 A | * | 10/1999 | Smith | F24F 6/043 |
| | | | | 261/106 |
| 6,394,427 B1 | * | 5/2002 | Guetersloh | F24F 6/02 |
| | | | | 261/106 |
| 6,569,291 B1 | * | 5/2003 | Knoche | B01D 3/008 |
| | | | | 202/158 |
| 6,572,085 B2 | * | 6/2003 | Bloemer | F24F 6/04 |
| | | | | 126/113 |
| 6,739,585 B1 | * | 5/2004 | Urbanski | B01D 3/008 |
| | | | | 261/114.1 |
| 7,287,746 B2 | * | 10/2007 | Fehr | B01D 3/008 |
| | | | | 261/114.5 |
| 7,950,631 B2 | * | 5/2011 | Vasudevan | F24F 6/043 |
| | | | | 261/106 |
| 7,988,931 B2 | | 8/2011 | Klinger et al. | |
| 2007/0194471 A1 | | 8/2007 | Nagaoka | |

FOREIGN PATENT DOCUMENTS

| | | |
|---|---|---|
| EP | 0471050 A1 | 2/1992 |
| GB | 2290045 A | 12/1995 |
| WO | 9112865 A1 | 9/1991 |

* cited by examiner

LIQUID DISTRIBUTOR IN COLUMNS, METHOD FOR PRODUCING A LIQUID DISTRIBUTOR AND COLUMN AND METHOD FOR SEPARATING SUBSTANCE MIXTURES

CROSS-REFERENCE TO RELATED APPLICATION

This is a continuation application, under 35 U.S.C. § 120, of copending International Application PCT/EP2017/066193, filed Jun. 29, 2017, which designated the United States; this application also claims the priority, under 35 U.S.C. § 119, of German Patent Application DE 10 2016 211 808.0, filed Jun. 30, 2016; the prior applications are herewith incorporated by reference in their entirety.

BACKGROUND OF THE INVENTION

Field of the Invention

The present invention relates to a liquid distributor suitable as an internal column component applicable to industrial process engineering. The present invention also relates to a method for producing the liquid distributor as well as a column and a method for separating substance mixtures.

A column is a process engineering apparatus in the form of a hollow, slender column including, depending on the intended purpose, a variety of internal components. In most cases, a column serves to separate substance mixtures by using various thermal processes. Physical properties and states of equilibrium between different phases are used for that purpose. Internal components typically found in columns are liquid collectors, liquid distributors, random or unstructured packings, structured packings, and bottoms or support plates for the packings.

In most cases, the liquid distributor serves to distribute a liquid, which is usually introduced through a liquid collector or a feed pipe, in a defined manner across the horizontal cross-section of the column and deliver it downwards. Typical liquid distributors are pipe distributors and trough distributors. FIG. 1 is a diagrammatic illustration of a typical trough distributor. Trough distributors usually include a main channel, which guides the liquid into corresponding side channels, from which the liquid is dispensed downwards, for example through openings in the bottom of the trough.

Trough distributors are typically manufactured from one-piece U-shaped sections made of metals or plastics materials. In addition, one-piece shaped sections made of graphite or ceramics are used in the case of special material requirements, for example highly corrosive liquids (European Patent Application EP 0471050 A1, corresponding to U.S. Pat. No. 4,994,210). In the case of metals, corresponding sheets are either bent or welded together. Shaped sections made of plastic are normally extruded. In addition, ceramic trough distributors can be produced by a ceramic precursor material being extruded and then thermally converted into the appropriate ceramic. As specified in European Patent Application EP 0471050 A1, corresponding to U.S. Pat. No. 4,994,210, trough distributors made of graphite are milled from a block, thus consuming a large amount of material.

Given that they all focus as much as possible on one-piece components, all of the known production methods are complicated and expensive. In the context of the present invention, "one-piece" means monolithic or, as it were, "from a single cast," as is true in cases such as welding.

SUMMARY OF THE INVENTION

It is accordingly an object of the invention to provide a liquid distributor in columns, a method for producing a liquid distributor and a column and a method for separating substance mixtures, which overcome the hereinafore-mentioned disadvantages of the heretofore-known liquid distributors, columns and methods of this general type and in which the liquid distributor is straightforward and economical to produce while being the equal of known liquid distributors regarding the requirements of bearing capacity, stability, chemical resistance, and performance.

In relation to achieving this object, it has in the context of the present invention been found that liquid distributors formed panels made of fiber composite materials are easy to assemble using an insertable building block system, and that the liquid distributor thus obtained provides bearing capacity, stability, chemical resistance and performance more than sufficient for the process engineering purpose intended.

With the foregoing and other objects in view there is provided, in accordance with the invention, a liquid distributor suitable as an internal column component for a defined distribution of a liquid flowing downward within a column, including at least a bottom and side walls, which constitute a container for the accommodation and defined distribution of the liquid, wherein the bottom and at least one of the side walls are constructed from panels that are connected to each other, and wherein the panel or panels of the at least one side wall include a fiber composite material.

With the objects of the invention in view, there is concomitantly provided a method for producing a liquid distributor suitable as an internal column component for a defined distribution of a liquid flowing downward in a column, the method including the following steps:

providing panels made of carbon fiber-reinforced carbon, and connecting the panels in a form-locking manner in such a way that the panels define a container including a bottom and side walls, in which the container is provided as a component of the liquid distributor for distributing the liquid as uniformly as possible.

A form-locking connection is one which connects two elements together due to the shape of the elements themselves, as opposed to a force-locking connection, which locks the elements together by force external to the elements.

Other features which are considered as characteristic for the invention are set forth in the appended claims.

Although the invention is illustrated and described herein as embodied in a liquid distributor in columns, a method for producing a liquid distributor and a column and a method for separating substance mixtures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
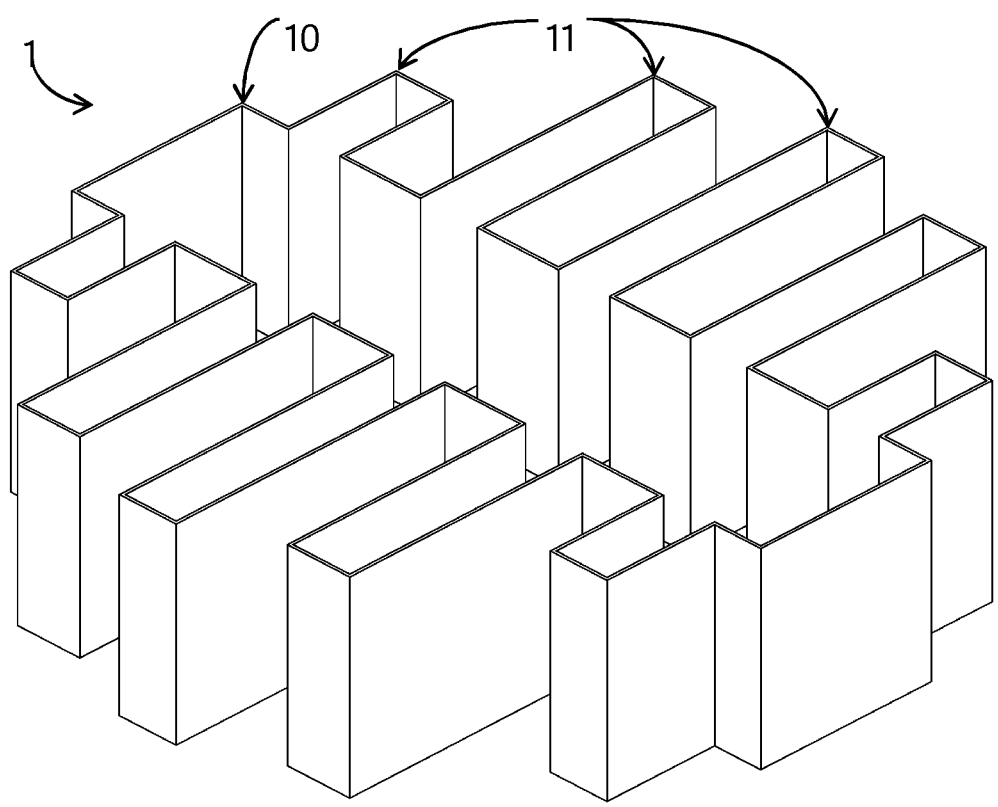
FIG. 1 is a diagrammatic, perspective view of a typical trough distributor.

Referring now to the figures of the drawings in detail and first, particularly, to FIG. 1 thereof, there is seen a diagrammatic depiction of a liquid distributor 1, with the liquid distributor including a main channel 10 and side channels 11 forming containers of a trough. FIG. 1 therefore relates to a trough distributor.

Figure 2:
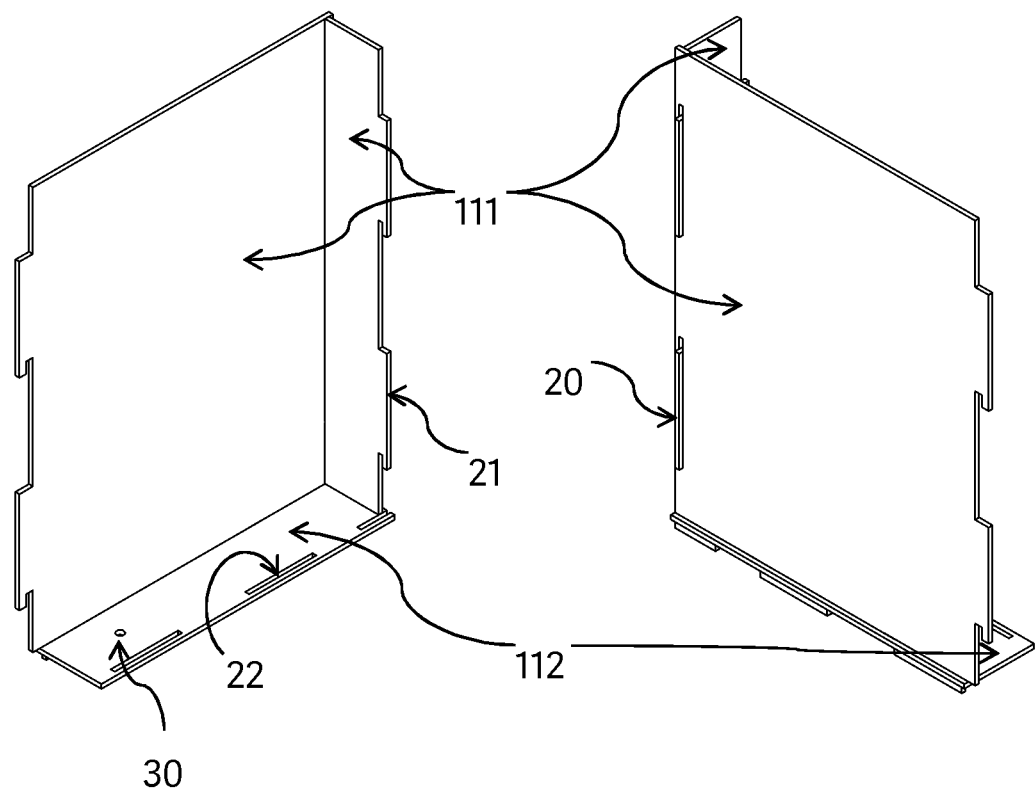
FIG. 2 includes two perspective views (interior and exterior) of a partially constructed trough according to a preferred embodiment of the present invention.

Depicted in FIG. 2 are partially constructed troughs, in which tabs 21 and slots 22 of two partially constructed troughs engage when brought together, with a lateral movement securing a panel in the slot by way of an undercut on the tab 21, so that the panel is thereby secured in an integral manner. A container 10, 11 is formed by a bottom 112 and side walls 111. An opening 30, through which liquid is delivered downward, is located in the bottom 112.

There is no particular restriction on the type of liquid distributor 1 according to the invention. All known constructions for liquid distributors 1 are possible, in particular trough distributors, bottom hole distributors, side hole distributors, single or multiple stage distributors, those with or without a main channel 10, with an integrated channel 10 or an attached main channel (pre-distributor box), and with or without a collector system. "Collector system" is understood to mean what is known in the industry as a liquid collector, which is mounted on a column above the distributor 1.

In the context of the present invention, "panel" 111, 112 is understood to mean a planar, flat component formed of a rigid material. The bottom 112 or a side wall 111 of a respective container 10, 11 can be formed of or be constructed from one as well as multiple panels. However, as long as it is feasible given the desired dimensions of the liquid distributor 1, it is preferable for both the bottom 112 and the side walls 111 to be formed of or be constructed from a single panel 111, 112. There is no particular restriction on the panel thickness or depth. The panel thickness is selected according to the construction and dimensions of the liquid distributor according to the invention 1, in which context the bearing capacity thereof must of course be ensured. Nor is there any particular restriction on the dimensions of the liquid distributor 1 according to the invention. The liquid distributor 1 according to invention typically has a diameter in the range from 100 mm up to several meters, for example 3 m.

In the context of the present invention, "defined distribution" is understood to mean that the quantity and the position of the downward liquid delivery can be precisely adjusted as needed. Typically, this takes place by providing precisely positioned openings 30 having exact dimensions being provided in the bottom 112 or in a side wall 111 of the container 10, 11.

In the context of the present invention, the term "container" is an umbrella term describing, for example, a trough 10, 11. Depending upon the terminology for the liquid distributor 1 in question, the main channel 10 and the side channels 11 may also be referred to as containers 10, 11. The liquid distributor 1 according to the invention preferably is formed of a plurality of the containers 10, 11 according to the invention. Like the panels, the containers 10, 11 are also connected to each other, normally by way of a central main channel 10.

Preferably, the panels that are connected to each other are connected to each other in a form-locking manner. In principle, the panels that are connected to each other can be at any desired angle with respect to each other. Typically, and preferably, two panels that are connected to each other, each of them constituting different parts of the container 10, 11, are at a right angle with respect to each other (with, for example, one panel constituting the bottom 112 and the other constituting a side wall 111).

According to a particularly preferable embodiment, the panels that are connected to each other at least in a form-locking manner are engaged with and secured to each other by way of an insertable connection 20. There is no particular restriction on the type of insertable connection 20. In particular, possible connections include connections in the manner of puzzle pieces, dovetails, clip connections, engaging and locking connections, and tongue-and-groove connections. Shown in FIG. 2 is one possible variation of a tab-and-slot connection, with tabs 21 engaging with slots 22 and a lateral movement securing the panel in the slot by way of an undercut on the tab 21. Screw connections, for example, are also possible, but they are more complicated and therefore expensive, hence less preferable.

The insertable connection 20 preferably includes at least one securing element for securing the insertable connection 20. There is no particular restriction in this case on the type of securing element. Preferable securing elements include clips which, further preferably, are formed of the same material as the panels. In most cases, the clips are constructed to be flat and include elements forming a form-locking connection. One example of a preferable clip is described in German Utility Model DE 20 2010 015 436 U1.

The securing elements can be integrated into the component (such as in the tab connection in FIG. 2) and they can be separate elements as well.

According to a preferable embodiment of the liquid distributor 1 according to the invention, the fiber composite material includes at least one textile fabric, whereby at least one the textile fabrics is a unidirectional layer. The advantage thereby is that stability and rigidity can be selectively introduced in places where they are required. Since the liquid distributor 1 normally need not move while in operation, it is mainly subject to static forces in a consistent direction. Through the use of the selective construction including unidirectional reinforcement, the overall weight of the liquid distributor 1 can be efficiently utilized and therefore reduced.

The fiber composite material preferably also contains carbon fibers. In addition to their stability-related advantages like tensile strength and rigidity, they also offer chemical stability.

According to a preferable embodiment of the liquid distributor 1 according to the invention, the fiber composite material includes a matrix which is selected from the group consisting of a polymer matrix and a carbon matrix. However, in terms of chemical stability, which is usually necessary, a carbon matrix is preferable. Carbon fiber-reinforced polymers (CFRP) or carbon fiber-reinforced carbon (CFRC) are particularly preferable. In the context of the present invention, there is no particular restriction on the exact nature of these materials. The methods for producing these materials are also known and are therefore not the subject-matter of the present invention. In principle, each of these materials is able to be used in the liquid distributor 1 according to the invention, regardless of how they are produced.

According to a preferable embodiment of the liquid distributor 1 according to the invention, the panels that are connected to each other at least in a form-locking manner by way of an insertable connection 20 exhibit a residual porosity, so they are not liquid-tight or gas-tight.

One would assume that panels which are not liquid-tight would be unsuitable, especially for the intended use of a liquid distributor 1. However, it has in the context of the present invention been found that the residual porosity can be disregarded in regard to this application. Of course, it is possible to seal the panels in a liquid-tight manner by applying an impregnation resin. However, since it is not absolutely necessary, it is preferable to disregard the method step of impregnation.

According to a particularly preferable embodiment of the liquid distributor 1 according to the invention, the liquid distributor 1 includes at least two of the containers 10, 11, whereby the bottom 112 and all of the side walls 111 of the containers 10, 11 are constructed from panels which are formed of carbon fiber-reinforced carbon (CFRC), and whereby at least two of the panels of a container 10, 11 are connected to each other at least in a form-locking manner. In addition, the use of panels which are not liquid-tight is entirely sufficient for the performance required of this particularly preferable embodiment.

A further aspect of the present invention resides in a method for producing a liquid distributor 1 suitable as an internal column component for a defined distribution of a liquid flowing downward in a column, the method comprising the following steps:

providing panels made of carbon fiber-reinforced composite material, and
   connecting and securing the panels in a form-locking manner in such a way that the panels define a container 10, 11 including a bottom 112 and side walls 111, with the container being provided as a component of the liquid distributor 1 for the defined distribution of the liquid.

Another aspect of the present invention is a column which includes at least one liquid distributor according to the invention, whereby the column is suitable for separating substance mixtures.

An additional aspect is a method for separating substance mixtures in a column, whereby the column includes at least one liquid distributor.

The preferable embodiments of the liquid distributor 1 according to the invention described as part of the present invention may be combined in an appropriate manner with the method according to the invention. As a result, extensive repetitions have been omitted.

The present invention is explained hereinafter in reference to an illustrative example, in which context the illustrative example does not represent a restriction on the invention:

1) Producing the required CFRC and/or CFRP panel material for the bottoms 112 and the side walls 111 of the distributor (CFRC and CFRP panels are commercially available from SGL Carbon GmbH under the trademark Sigrabond®);
2) Cutting the individual parts (e.g., bottom panels 112, side walls 111, fastenings) to the desired size along with slots and tabs by using a water jet;
3) Construction of the first distributor channel takes place according to the following principle:
   a) using the slots and tabs provided for this purpose to engage the four side walls 111 together to form a rectangle that is open at the top and bottom;
   b) sliding the bottom panel 112 into the tabs on the side walls 111 provided for this purpose; and
   c) securing the insertable connections, for example, by way of clip connections (separate securing elements) or engagement (integral securing elements);
4) Construction of the remaining distributor channels is similar to item 3;
5) Connecting the distributor channels that have been individually engaged together through CFRC and CFRP connecting parts to form the overall distributor; and
6) Securing the connecting parts (clip, engagement, etc.).

The invention claimed is:

1. A liquid distributor, comprising:
   an internal column component for a defined distribution of a liquid flowing downward within a column, said internal column component including:
      at least one bottom and side walls forming a container for accommodation and defined distribution of the liquid;
      said bottom and at least one of said side walls being constructed as interconnected planar flat panels;
      said interconnected panels being connected to each other at least in a form-locking manner; and
      at least one panel of said at least one side wall including a fiber composite material.

2. The liquid distributor according to claim 1, wherein said panels being connected to each other at least in said form-locking manner engage with each other by way of an insertable connection.

3. The liquid distributor according to claim 2, wherein said insertable connection includes at least one securing element for securing said insertable connection.

4. The liquid distributor according to claim 2, wherein said panels being connected to each other at least in a form-locking manner by way of said insertable connection include at least one connecting region having contact surfaces on each of said panels for contacting another respective panel, and no measures for a cohesive connection between respective contact areas of said panels is provided in said at least one connecting region.

5. The liquid distributor according to claim 1, wherein said fiber composite material includes at least one textile fabric including at least one unidirectional fabric layer.

6. The liquid distributor according to claim 1, wherein said fiber composite material includes carbon fibers.

7. The liquid distributor according to claim 1, wherein said fiber composite material includes a matrix selected from the group consisting of a polymer matrix and a carbon matrix.

8. The liquid distributor according to claim 1, wherein said container is one of at least two containers, said panels of said bottoms and all of said side walls of said containers are formed of carbon fiber-reinforced carbon, and at least two of said panels of a container are connected to each other at least in a form-locking manner.

9. A column being suitable for separating substance mixtures, the column comprising at least one liquid distributor according to claim 1.

10. A method for separating substance mixtures in a column, the method comprising using at least one liquid distributor according to claim 1 for separating the substance mixtures in the column.

11. A method for producing a liquid distributor, the method comprising the following steps:
   providing panels made of carbon fiber-reinforced carbon;

connecting the panels in a form-locking manner to define a container being an internal column component of the liquid distributor for a defined distribution of a liquid flowing downward in a column as uniformly as possible; and providing the container with a bottom and side walls.

12. The method according to claim 11, which further comprises providing the panels as planar flat panels.

* * * * *